US009517535B2

(12) United States Patent
Zanon et al.

(10) Patent No.: US 9,517,535 B2
(45) Date of Patent: Dec. 13, 2016

(54) METHOD FOR REPAIRING A PIECE

(71) Applicant: AVIO S.p.A., Turin (IT)

(72) Inventors: Giovanni Paolo Zanon, Turin (IT); Agostino Scialpi, Turin (IT)

(73) Assignee: GE AVIO S.r.L., Turin (IT)

( * ) Notice: Subject to any disclaimer, the term of this patent is extended or adjusted under 35 U.S.C. 154(b) by 232 days.

(21) Appl. No.: 13/921,553

(22) Filed: Jun. 19, 2013

(65) Prior Publication Data

US 2013/0333180 A1 Dec. 19, 2013

(30) Foreign Application Priority Data

Jun. 19, 2012 (IT) .............................. TO2012A0537

(51) Int. Cl.
*B23P 6/00* (2006.01)
*C23C 26/00* (2006.01)

(52) U.S. Cl.
CPC .................. *B23P 6/00* (2013.01); *C23C 26/00* (2013.01); *Y10T 29/49746* (2015.01)

(58) Field of Classification Search
CPC ................ B23P 6/04; B23P 9/04; B05D 1/08; B05D 1/10; B05D 1/38; B05D 5/005; C23C 26/02; C23C 4/12; C23C 4/121; C23C 4/122; C23C 4/124; C23C 4/125; C23C 2/127; Y10T 29/29746

See application file for complete search history.

(56) References Cited

U.S. PATENT DOCUMENTS

| 3,696,563 | A | * | 10/1972 | Rands | B24D 18/00 15/197 |
| 3,834,200 | A | * | 9/1974 | Winter | B21D 31/06 451/466 |
| 4,649,086 | A | | 3/1987 | Johnson | |
| 5,301,863 | A | * | 4/1994 | Prinz | B22F 3/008 156/59 |
| 7,954,348 | B2 | * | 6/2011 | Forgues | B24B 49/16 451/466 |
| 2007/0207339 | A1 | | 9/2007 | Zimmerman et al. | |
| 2009/0056096 | A1 | * | 3/2009 | Hixson | B23P 6/007 29/402.05 |
| 2011/0138596 | A1 | * | 6/2011 | Namba et al. | 29/402.18 |

OTHER PUBLICATIONS

Tucker Jr., Robert C.. (2013). ASM Handbook, vol. 05A—Thermal Spray Technology. ASM International. Online version available at: http://app.knovel.com/hotlink/toc/id:kpASMHVATI/asm-handbook-volume-5a/asm-handbook-volume-5a.*

(Continued)

*Primary Examiner* — Jason L Vaughan
*Assistant Examiner* — Amanda Meneghini
(74) *Attorney, Agent, or Firm* — Davidson Berquist Jackson & Gowdey, LLP.

(57) ABSTRACT

A material is deposited on the surface of a piece to be repaired, by means of two steps of electro-spark deposition alternated with an intermediate compaction step, which reduces the surface asperity of a layer of material deposited before another material is deposited; the compaction phase is defined by shot peening, performed by means of shots supported by at least one flexible element supported projecting from a rotating shaft.

15 Claims, 2 Drawing Sheets

(56) References Cited

OTHER PUBLICATIONS

ASM International Handbook Committee. (1994). ASM Handbook, vol. 05—Surface Engineering—62.1.1 Plasma Spray. ASM International. Online version available at: http://app.knovel.com/hotlink/pdf/id:kt007OBN02/asm-handbook-volume-05/plasma-spray.*
Italian Search Report, May 13, 2013 in IT Appln No. TO20130537.
3M Surface Conditioning Products, Application Notes/Bulletin, Roto Peen Flap Assemblies TC330, 2003, 12 pages, published by 3M Abrasives, St. Paul, MN, US.

* cited by examiner

METHOD FOR REPAIRING A PIECE

The present invention relates to a method for repairing a piece.

BACKGROUND OF THE INVENTION

Depositing material on a substratum, defined by a piece to be repaired, by means of a technique called "electro-spark deposition", also indicated as "ESD", similar to micro-welding, is known and consists in transferring small drops of a molten material onto said substratum, starting with a consumable rotating electrode.

The material is transferred thanks to formation of electric sparks between the rotating electrode and the substratum. The electrode is simultaneously enveloped by a flow of inert gas which locally protects said electrode, the working area and the substratum. The drops of material are welded onto the surface of the substratum and form superimposed layers of coating material by repeatedly passing the rotating electrode over the substratum. At the same time, the combined action of rotation of the electrode and the pulse-type sparks prevents the electrode from welding to the substratum.

The electric sparks have a relatively high frequency but extremely short duration (a few milliseconds), so the material is deposited with a low thermal contribution and without causing overheating or thermally altered zones in the substratum.

However, the deposited material is uneven, due to its nature, since it is formed of small drops deposited onto each other. The rotating electrode effectively tends to touch the zones with peaks of material already deposited and to deposit other drops in these zones, accentuating the difference between peaks and valleys.

In order to overcome this problem, it is necessary to reduce the asperities of the surface which are progressively being formed, periodically interrupting deposition and compacting the layer of material deposited so far, before proceeding with deposition of another layer. In general, the surface asperities are lowered by means of hammering. This is an effective operation, but the quality obtained is not reproducible from one piece to another and sometimes, on a given piece, it is uneven for the entire extension of the material deposited.

Furthermore, hammering is not always controllable, so, on material with low ductility, hammering may cause micro-fractures which compromise functioning and/or duration of the repair.

Furthermore, hammering on pieces with a thin wall could cause deformations, which can only be partly limited through use of containment tools (such as an anvil).

As an alternative to hammering, compacting is performed by means of ultrasound technology, but this requires relatively expensive instruments.

SUMMARY OF THE INVENTION

The aim of the present invention is providing a method for repairing a piece, which solves the problems described above in a simple and inexpensive way.

According to the present invention a method for repairing a piece is provided as claimed in claim 1.

BRIEF DESCRIPTION OF THE DRAWINGS

The invention will now be described with reference to the appended drawings, which illustrate a non-limiting embodiment thereof, wherein.

DETAILED DESCRIPTION OF THE INVENTION

Figure 1:
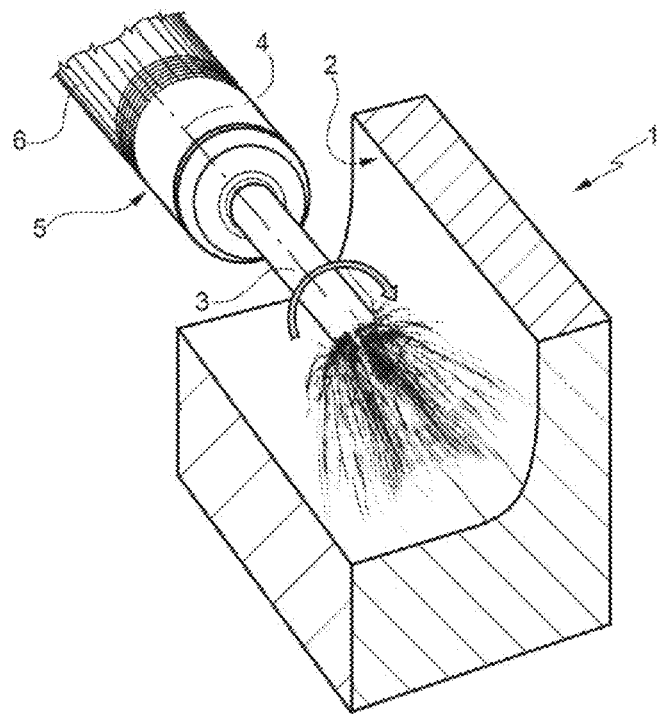
FIGS. 1 and 2 show respective steps of a preferred embodiment of the method for repairing a piece, according to the present invention.

With reference to FIG. 1, the number 1 denotes, in its entirety, a piece (partially shown) having a surface 2 onto which the material must be deposited, since the surface 2 is a worn or damaged surface, and must therefore be restored to its original dimensions and shape. In general, the material deposited is the same as the original material of the substratum to be repaired, defined by the piece 1. In particular cases, the deposited material may be different to the original material forming the surface 2.

The material is deposited with successive runs on the surface 2, by means of a technique known as "electro-spark deposition", also indicated as ESD. With this technique, the material is transferred in drops onto the surface 2 from an electrode 3, generating a pulsating electric current, which creates sparks between the piece 1 and said electrode, while a protective atmosphere is preferably formed (for example an argon atmosphere) around the working area.

The material of the electrode 3 therefore coincides with the material to be deposited and is consumed during the deposition step. In general, the electrode 3 is defined by an elongated bar along an axis 4 and forms part of an instrument 5 (partially shown) comprising a gripping element 6 which is gripped by the operator or by a robotised system to move the electrode 3 on the surface 2. The electrode 3 is placed in rotation around the axis 4 (in a manner not shown) with respect to the handle 6, to avoid being welded to the piece 1 during deposition.

The drops of molten material deposited on the piece 1, on solidifying, tend to form a layer of material with a surface 7 (FIG. 2) with peaks and valleys, i.e. with a high roughness. Therefore, between deposition of one layer and the next layer, an intermediate compaction or flattening step is provided, to reduce the asperities or peaks of the surface 7. By way of example, FIG. 3 shows a metallography of a layer without the compaction phase.

The number of runs after which to perform the compaction step is a function of the type of material deposited and the morphology of the deposit. Compaction is preferably performed after each run.

Figure 2:
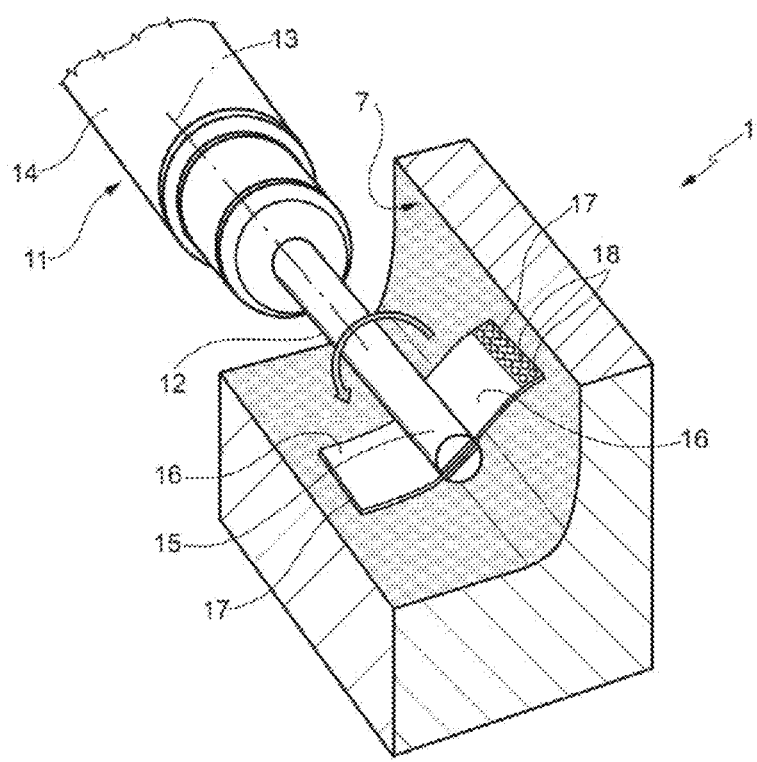
Figure 3:
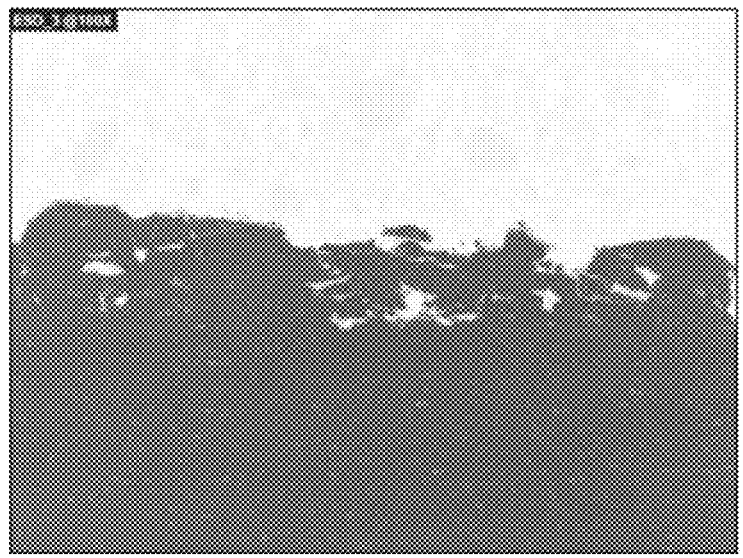
FIGS. 3 and 4 show, in a simplified manner, a metallography of deposited material, with or without execution of the step of FIG. 2.

As visible in FIG. 2, the compaction step is defined by shot peening, performed by means of an instrument 11 (partially shown) comprising a shaft 12 extending along an axis 13 projecting with respect to a support 14, which preferably defines a handle to grip and move the shaft 12, manually or automatically, on the surface 7.

The inner end of the shaft 12 is controlled by an electric or pneumatic motor (not shown) so as to rotate around an axis 13 with respect to the support 14. The free end of the shaft 12 is indicated with reference number 15 and supports at last one flexible tab 16, which is fixed and projects in a flag-like manner with respect to the shaft 12. In turn, the external radial end 17 of the tab 16 supports a plurality of shots 18. Preferably, two diametrically opposite tabs 16 are provided.

Maintaining the axis 13 substantially parallel to the surface 7 and maintaining the shaft 12 close to the piece 1 (at a lower distance than the radial extension of the tabs 16), the shots 18 hit the surface 7 during rotation. In practice, the tabs 16 are a kind of whip which, by means of the shots 18 arranged at ends 17 strike and flatten the peaks of the surface 7. As an alternative to the tabs 16, the shots 18 could be supported by wires or flexible bristles, coupled to an end 15 of the shaft 12 so as substantially to form a brush rotating around the axis 13.

The quality of compaction and the degree of flattening of the surface 7 change as a function of the shot peening parameters. In particular, these parameters are defined by: the rotation speed of the shaft 12; the axial and radial dimensions of the tabs 16; the size, composition and density of the shots 18; the duration of the shots; the distance of the shaft 12 from the surface 7.

As is known, the intensity of a shot peening process is measured and controlled on special unified test samples, is expressed in Almen degrees and substantially indicates the quantity of energy which is being transferred to the piece by the blow of the shots. The correlation between the values assigned to said parameters and the intensity of shot peening is therefore known. Obviously, the same shot peening intensity may correspond with different combinations of values for said parameters.

Figure 4:
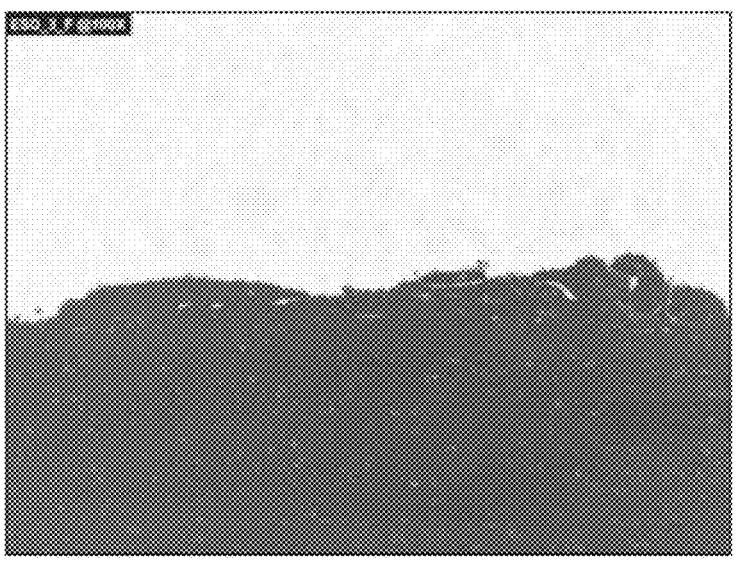

In order to make the repairing method of the present invention repeatable, the intensity of shot peening is first placed in correlation with the compaction quality, which may be determined, for example, by means of metallographic analysis of the deposited material (FIG. 4). In other words, the compaction quality is assessed by means of preliminary tests as a function of the shot peening intensity, for the specific material to be deposited and for a given quantity of deposited material, defined, for example, by the number of ESD runs. On the basis of this assessment, an optimal value for the shot peening intensity is therefore determined, or a minimum value, or a range, necessary to obtain the desired compaction quality.

For example, in order to obtain good compaction, it is necessary to set a speed of 5000 revolutions per minute for rotation of the shaft 12, a radial dimension of 16 mm for the tabs 16, a distance of 10 mm between the shaft 12 and the surface 7, and a shot peening duration of 2 minutes after each three ESD runs.

As known, shot peening is generally used on a finished surface of a piece as a technique to introduce residual compression strength which improves the fatigue strength. In the procedure of the present invention, on the other hand, it is clear that the shot peening is used at a different moment and to obtain a different result, i.e. as an intermediate step between the two ESD steps to reduce the surface asperities of a surface 7 provisionally formed and to reduce any internal unevenness of the deposited material.

The ESD and shot peening steps continue, alternating with each other, in a sufficient number to reach at least the planned material thickness according to project.

In particular, with this alternation of the steps a higher volume of material tends to be deposited than according to the project, so a part of the deposited material is then removed, for example by means of mechanical processing, to obtain the desired dimensions. At the end, the finished condition envisaged on the repaired piece is normally restored. The finished condition may be the one of the last mechanical processing performed or further processing may be introduced, such as sandblasting, anode oxidation, surface conversions, galvanic depositions, shot peening, surface hardening, etc.

The advantages of the procedure claimed and described with reference to the appended drawings are apparent from the above. In the first place, as shown in FIG. 4, compaction performed on the surface 7 has a high and even quality, and therefore better than the solutions in the prior art where hammering is envisaged.

Furthermore, it is possible to adjust the shot peening parameters to obtain the desired compaction quality, so the procedure is perfectly controlled and repeatable. In particular, by setting the shot peening parameters so as to have a specific shot peening intensity, the quality of the repair is reproducible for all the pieces with an excellent approximation.

Furthermore, the specific shot peening technique, performed by means of a flexible tab (16) supported projecting from a rotating shaft (12), requires relatively low costs and may also be used in zones which are difficult to reach and/or relatively small, such as the inner surfaces of holes and/or small surfaces to be repaired, for example. In particular, the shape and external dimensions of the instrument 11 are very similar to those of the instrument 5, so said instrument 11 is able to reach the same zones which may be reached by said instrument 5.

It is clear that changes and variants may be made to the method described above without deviating from the area of protection as defined by the appended claims.

In particular, as mentioned above, the tabs 16 could be replaced with other flexible supporting elements which extend radially and projecting with respect to the rotation axis 13; and/or the coupling method of the tabs 16 to the end 15 of the shaft 12 could be different to the one shown in FIG. 2.

As mentioned above, each layer of material deposited may be formed of one or more ESD runs, particularly as a function of the material deposited.

The invention claimed is:

1. A method for repairing a piece, comprising the steps of:
performing a first electro-spark deposition step so as to form a first layer of material on a surface to be repaired forming part of said piece;
performing at least a second electro-spark deposition step so as to form a second layer of material on said first layer;
performing an intermediate compaction step between said first and said at least second electro-spark deposition steps, so as to reduce surface asperities of the first layer of material before initiating the second deposition step;
wherein said compaction step comprises the step of shot peening, performed by a plurality of shots supported by at least one flexible element, which extends radially with respect to an axis and the additional step of rotating the at least one flexible element about said axis thereby impacting the plurality of shots against the layer being compacted.

2. The method according to claim 1, wherein the deposited material is the same as the original material of the surface to be repaired.

3. The method according to claim 1, comprising further shot peening after said second electro-spark deposition step, in order to reduce surface asperities of the second layer of material.

4. The method according to claim 1, wherein said axis, during shot peening, is maintained in a position substantially parallel to the shot peened surface.

5. The method according to claim 1, further including a step of assessing the compaction quality as a function of shot peening intensity, by way of preliminary experimental tests;

said shot peening being carried out with parameters to obtain a shot peening intensity corresponding to a desired level of compaction quality.

6. The method according to claim 1, wherein the step of shot peening is performed at a rotation rate of about 5000 rpm.

7. A method for repairing a piece comprising the steps of:
depositing by electro-spark deposition a first layer of material on a surface of a piece being repaired;
depositing by electro-spark deposition a material so as to form a second layer of material on the first layer of material;
performing an intermediate compaction step between the first and second material deposition steps so as to reduce surface asperities of the first layer of material before the second deposition step by rotating a plurality of confined shots against the deposited layer thereby permitting the depositing of a higher volume of material; and
performing in an alternating manner the depositing by electro-spark deposition additional layers of material and the compacting of each of the additionally deposited layers of material to reduce surface asperities in each subsequently deposited layer prior to the next layer being deposited until a chosen deposited material thickness is achieved.

8. The method for repairing a piece as in claim 7 wherein the step of compacting surface asperities comprises shot peening using a plurality of shots on at least one flexible element.

9. The method for repairing a piece as in claim 8 wherein the at least one flexible element comprises a flexible tab.

10. The method for repairing a piece as in claim 8 wherein the at least one flexible element comprises flexible strands.

11. The method for repairing a piece as in claim 10 wherein the flexible strands comprise wires.

12. The method for repairing a piece as in claim 10 wherein the flexible strands comprise bristles.

13. The method for repairing a piece as in claim 7 wherein the material for both the first and second deposition steps is the same.

14. The method for repairing a piece as in claim 7 including the further step of machining the deposited material to obtain a desired material dimension.

15. The method according to claim 7, wherein the step of shot peening is performed by a device rotating at 5000 rpm and for a time of about 2 minutes.

* * * * *